Dec. 7, 1926.
L. C. KING
ADJUSTABLE NOSE PIECE FOR SPECTACLES
Filed June 28, 1924
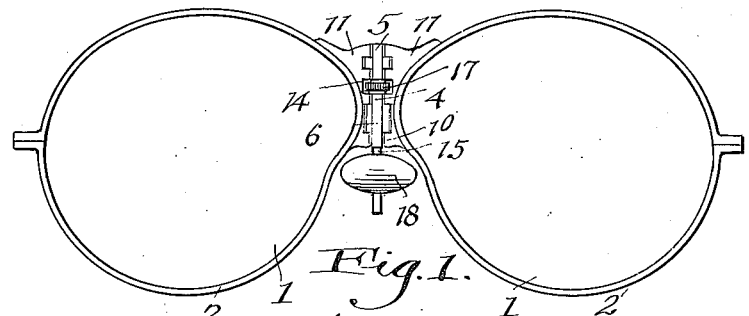
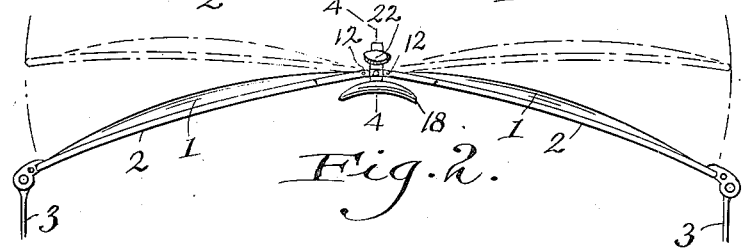
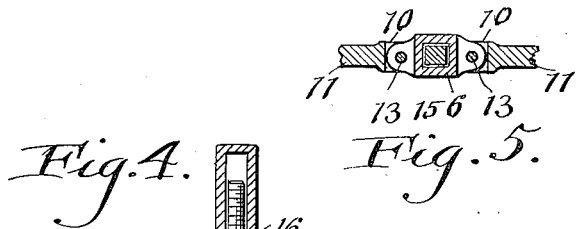
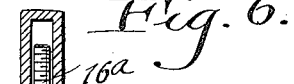
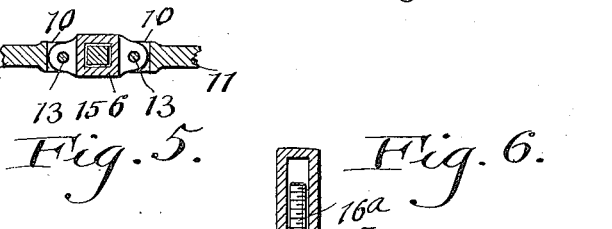
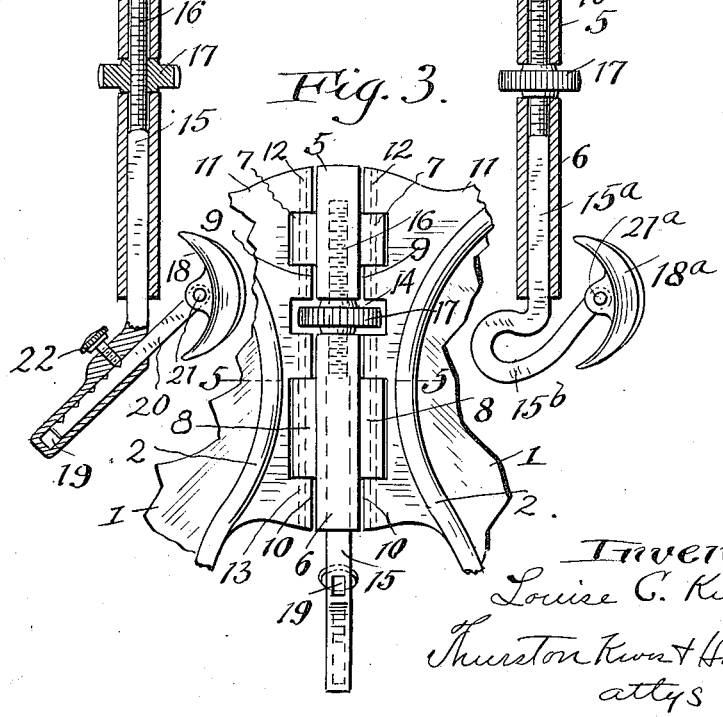

Patented Dec. 7, 1926.

1,609,477

UNITED STATES PATENT OFFICE.

LOUISE C. KING, OF CLEVELAND, OHIO.

ADJUSTABLE NOSE PIECE FOR SPECTACLES.

Application filed June 28, 1924. Serial No. 722,952.

This invention relates to spectacles, and has for its object to provide a nose piece which can be readily adjusted to position the lenses to suit the convenience of the wearer, the nose piece carrying member being bodily adjustable, and the adjusting means being such that the nose piece support will be positively held at any position to which it may be adjusted.

The present invention is particularly useful for spectacles of the type known as shooting glasses, and for goggles or spectacles such as used by out-door workers, automobilists and the like.

With the above and other objects in view, the invention may be said to comprise the structures illustrated in the accompanying drawings, hereinafter described and particularly set forth in the appended claims, together with such variations and modifications thereof as will be apparent to those skilled in the art to which the invention appertains.

Reference should be had to the accompanying drawings forming a part of this specification, in which Fig. 1 is a rear elevation of a pair of spectacles embodying the invention; Fig. 2 is a top plan view thereof; Fig. 3 is a fragmentary rear elevation showing the web connecting the lens frames and the nose piece supporting member adjustably mounted in the web; Fig. 4 is a vertical section on the line 4—4 of Fig. 2: Fig. 5 is a horizontal section on the line 5—5 of Fig. 3; Fig. 6 is a sectional view similar to Fig. 4, showing a modified form of nose piece support.

In the accompanying drawings the invention is shown applied to a pair of shooting glasses having relatively large curved lenses 1, enclosed in frames 2, and provided at their outer ends with the usual bows 3. The inner edges of the lens frames are relatively close together and are connected by a web indicated generally at 4, which serves to firmly support the lens frames. In spectacles of the type referred to, the individual lenses are curved, and the lens supporting framework is curved outwardly from one bow to the other so that the spectacles may fit closely upon the face of the wearer. In spectacles of this character it is desirable that there be a limited pivotal movement between the frames and the two lenses to permit the spectacles to be flattened out for insertion into a spectacle case.

The web 4 has therefore been shown as consisting of sections hinged together along the center line between the lenses to permit the spectacles to be collapsed for insertion into a spectacle case. This feature, however, is not essential to the present invention.

The pivotal connection is provided by means of upper and lower square posts 5 and 6, which have laterally projecting lugs 7 and 8 forming hinged knuckles which cooperate with similar lugs or knuckles 9 and 10 upon the inner edges of the web plates 11, which are integral with, or rigidly secured to the lens frames 2. The posts 5 and 6 are secured to the web plates 11 by means of hinge pins 12 and 13 which pass through the co-operating hinge knuckles 7 and 9 and 8 and 10 respectively.

The inner edges of the web plates 11 are notched, and the posts 5 and 6 are spaced with their lower and upper ends adjacent the upper and lower edges of the notches to provide a transverse slot 14 in the web 4.

The post 5 has a cylindrical bore from its lower end, and the lower post 6 is tubular and square in cross-section upon the interior. The hollow posts 5 and 6 form a socket in the web adapted to receive a vertical nose piece supporting rod 15 which has an upper cylindrical end 16 which is screw threaded and adapted to extend into the bore of the post 5, the lower portion of the rod 15 being square in cross-section and fitting within the tubular post 6. The upper threaded end 16 of the rod is engaged by a nut 17 which is positioned in the slot 14 of the web. By rotating the nut 17 the supporting rod 15 may be adjusted up or down in the web. The nut 17 projects upon both sides of the web 4 and can be readily grasped between a thumb and finger to adjust the rod. The nose piece 18, which is carried by the lower end of the rod 15, is preferably adjustable inwardly and outwardly with respect to the lenses, and to this end the lower end of the rod 15 may be provided with an outwardly and downwardly extending socket portion 19 which is adapted to receive a rod 20, to the outer end of which the nose piece 18 is connected by means of a pivot 21. The socket 19 and the rod 20 are preferably of square cross-section, and the rod 20 is adapted to be held in adjusted position in the socket 19 by means of a set screw 22.

In Fig. 6 of the drawing a modified form of nose piece support is provided. In this form, the nose piece support 15ᵃ is in the form of a rod having an upper threaded end 16ᵃ and a lower end portion, square in cross-section, the member 15ᵃ being adapted to be inserted into the posts 5 and 6 and to be adjusted therein by the nut 17 exactly as in the modification first described. The lower end 15ᵇ of the rod 15ᵃ is looped outwardly and has its lower end extending inwardly beyond the inner side of the web and connected to a nose piece 18ᵃ by means of a pivot 21ᵃ. The rod 15ᵃ is made of easily bendable material, and the loop portion 15ᵇ provides means whereby the nose piece 18ᵃ may be positioned inwardly and outwardly with respect to the web.

Having described my invention, I claim:

1. In a pair of spectacles, the combination with the two lenses held together by a connecting member, of a supporting member carried by the connecting member, means for adjusting the supporting member upwardly or downwardly with respect to the lenses, and a nose piece carried by the supporting member, said nose piece being adjustable inwardly or outwardly with respect to the lenses.

2. In a pair of spectacles, the combination with the two lenses held together by a connecting member, of a rod carried by the connecting member and positioned substantially in the plane of the adjacent edge portions of the lenses, means for adjusting said rod longitudinally, and a nose piece carried by the rod and movable therewith upwardly and downwardly with respect to the lenses.

3. In a pair of spectacles, the combination with the two lenses thereof, of a connecting web extending between the lenses, a rod positioned substantially in the plane of the web and having its upper end slidably mounted in the web, means for holding the rod in different adjusted positions with respect to the web, and a nose piece connected to the lower end of the rod and movable therewith upwardly and downwardly with respect to the lenses.

4. In a pair of spectacles, the combination with the two lenses thereof, of a connecting web extending between the lenses, said web being formed with a central vertically disposed socket, a rod having a threaded portion disposed in said socket, a nut co-operating with the threaded portion of the rod and said web to adjust said rod, and a nose piece carried by the rod.

5. In a pair of spectacles, the combination with the lenses, of a connecting member between the lenses, a vertically disposed rod slidably and non-rotatably mounted in the connecting member, a nose piece carried by the rod and adapted to be adjusted laterally with respect thereto, and means for adjusting the rod longitudinally and for securing the same in adjusted positions.

6. In a pair of spectacles, the combination with the lenses, of a connecting web extending between the lenses, said web having a central vertically disposed socket open at one end and a transverse slot across the socket intermediate the ends thereof, a rod extending into the socket, said rod being slidably but non-rotatably mounted in the socket and having a threaded portion, a nut engaging the threaded portion of the rod and disposed in said slot, and a nose piece carried by said rod.

7. In a pair of spectacles, the combination with the lenses, of a connecting web extending between the lenses, said web having a central vertically disposed socket open at its lower end and closed at the top and a transverse slot across the socket intermediate the ends thereof, a rod extending into the socket, said rod being slidably but non-rotatably mounted in the socket and having a threaded upper end, a nut engaging the threaded end of the rod and disposed in said slot, the rod at its lower end having an angularly disposed portion, and a nose piece carried by said angularly disposed portion.

In testimony whereof, I hereunto affix my signature.

LOUISE C. KING.